(12) United States Patent
Wang et al.

(10) Patent No.: US 11,622,842 B2
(45) Date of Patent: Apr. 11, 2023

(54) ECCENTRIC VIBRATION STRUCTURE OF ELECTRICAL TOOTHBRUSH

(71) Applicant: JIASHAN D-MAX ELECTRONICS CO., LTD., Jiaxing (CN)

(72) Inventors: Wei-Chuan Wang, Jiaxing (CN); Qiang Wei, Jiaxing (CN)

(73) Assignee: JIASHAN D-MAX ELECTRONICS CO., LTD., Jiaxing (CN)

( * ) Notice: Subject to any disclaimer, the term of this patent is extended or adjusted under 35 U.S.C. 154(b) by 342 days.

(21) Appl. No.: 16/824,713

(22) Filed: Mar. 20, 2020

(65) Prior Publication Data
US 2021/0177562 A1 Jun. 17, 2021

(30) Foreign Application Priority Data
Dec. 13, 2019 (TW) ................. 108145781

(51) Int. Cl.
*A61C 17/34* (2006.01)
(52) U.S. Cl.
CPC ................ *A61C 17/3481* (2013.01)
(58) Field of Classification Search
CPC ............................................. A61C 17/3481
See application file for complete search history.

(56) References Cited

FOREIGN PATENT DOCUMENTS

| CA | 2042499 A1 | 11/1991 |
|----|------------|---------|
| CN | 1631555 A | 6/2005 |
| CN | 209678737 U | 11/2019 |
| JP | 5194904 B2 | 5/2013 |
| TW | 294031 | 12/1996 |
| TW | I659730 B | 5/2019 |

OTHER PUBLICATIONS

Search Report dated Apr. 14, 2020 issued by Taiwan Intellectual Property Office for counterpart application No. 108145781.

*Primary Examiner* — Shay Karls
(74) *Attorney, Agent, or Firm* — Demian K. Jackson; Jackson IPG PLLC

(57) ABSTRACT

An eccentric vibration structure of electrical toothbrush includes an eccentric rod. Two ends of the eccentric rod are respectively formed with a transmission section and a weight section. The transmission section is drivable by a driving force to rotate so as to drive the weight section to eccentrically vibrate. The weight section has at least one weight part for partially or totally increasing the weight of the weight section, whereby due to the increased weight, the weight section is unbalanced in weight to deflect from a central axis of the eccentric rod.

19 Claims, 14 Drawing Sheets

Fig. 1

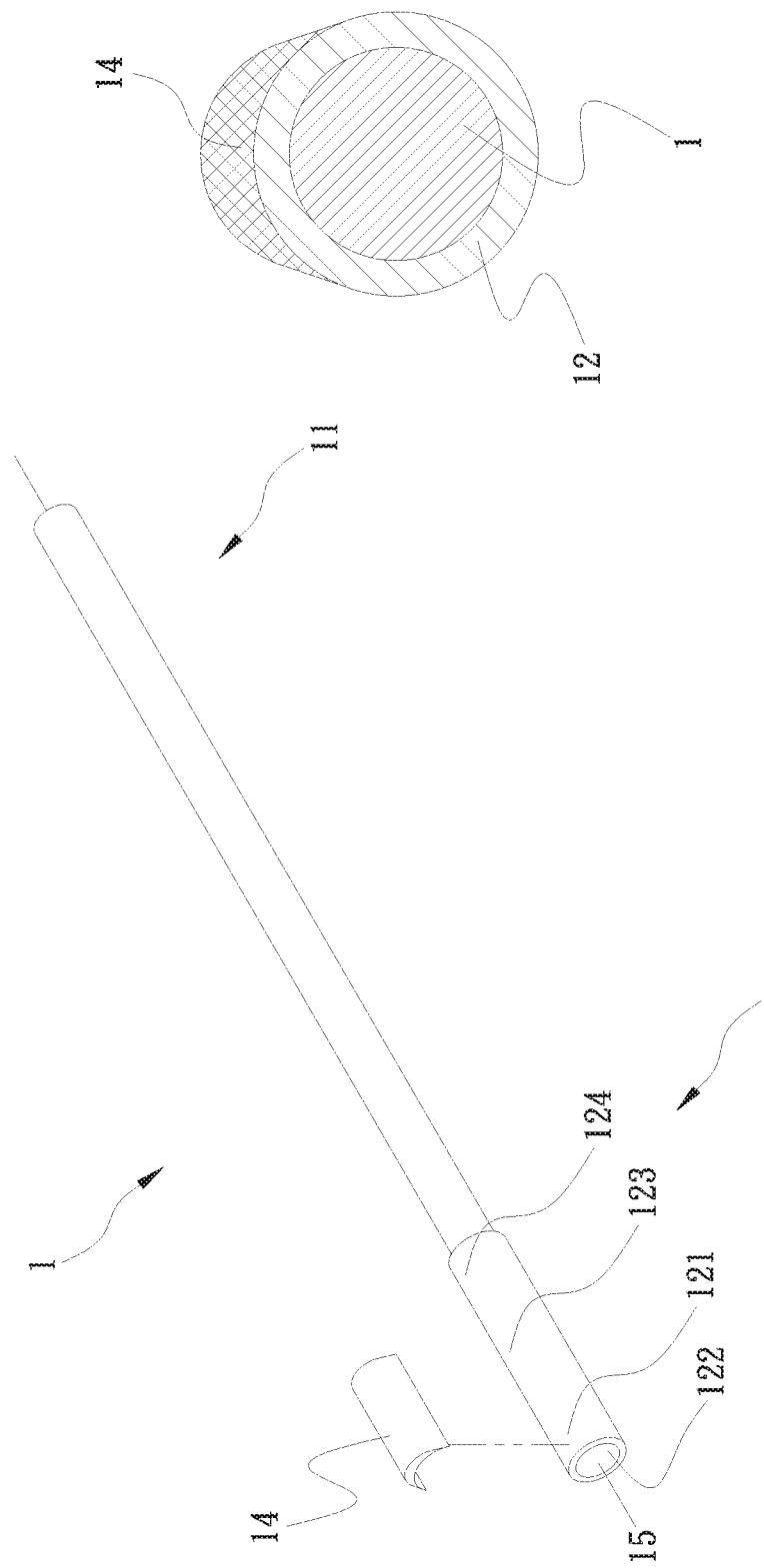

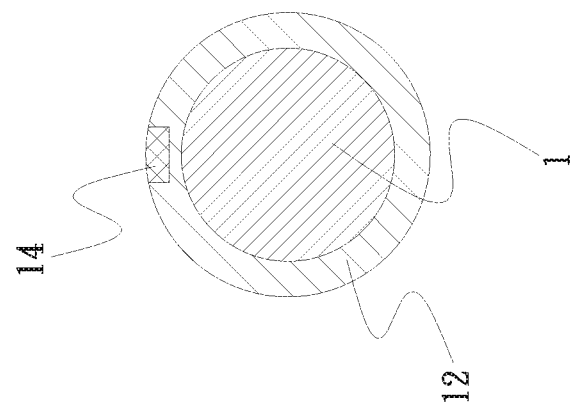
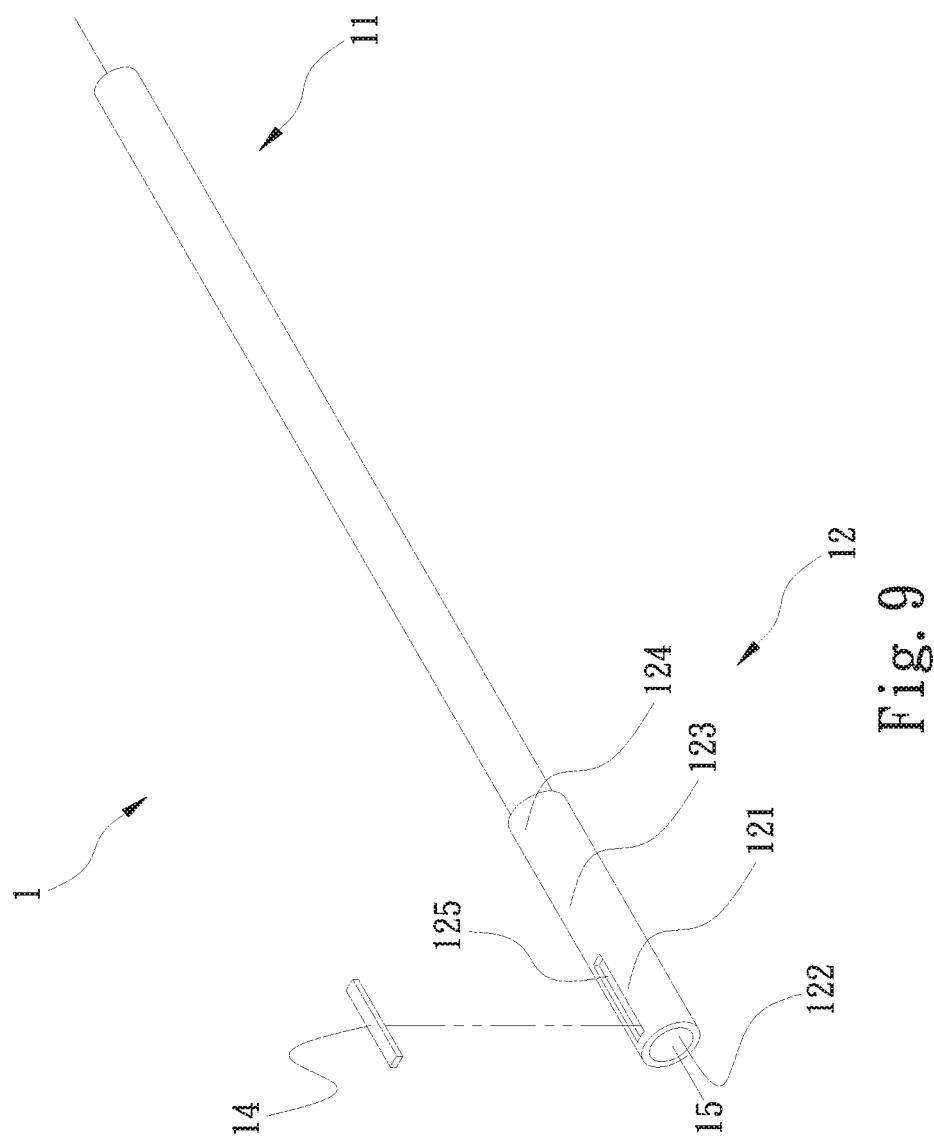
Fig. 10
Fig. 9

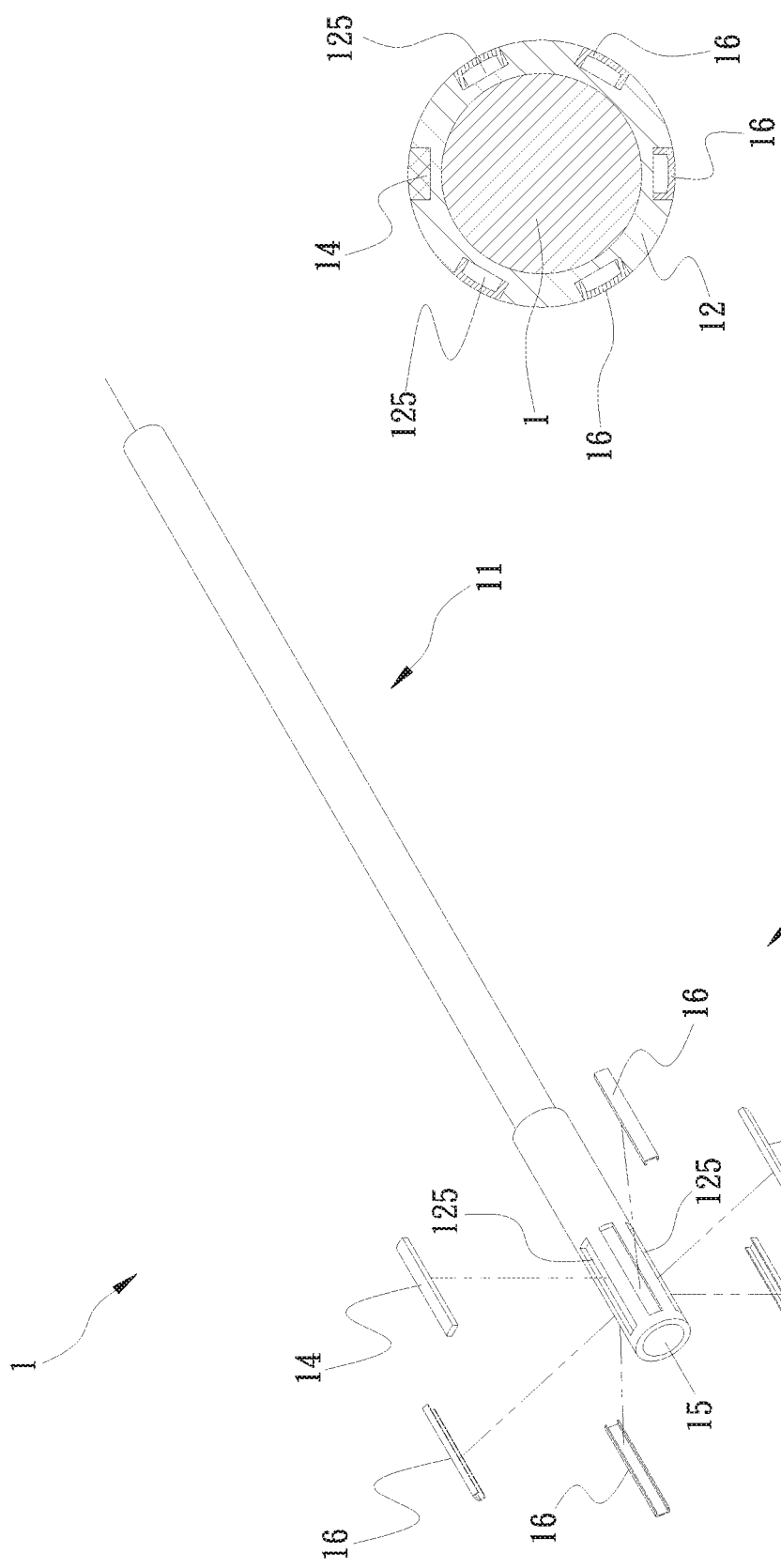

ECCENTRIC VIBRATION STRUCTURE OF ELECTRICAL TOOTHBRUSH

This application claims the priority benefit of Taiwan patent application number 108145781 filed on Dec. 13, 2019.

BACKGROUND OF THE INVENTION

1. Field of the Invention

The present invention relates generally to a vibration structure, and more particularly to an eccentric vibration structure of electrical toothbrush.

2. Description of the Related Art

In a conventional electrical toothbrush, in order to enhance the tooth-brushing effect, the brush head must be vibrated. The conventional electrical toothbrush has an eccentric shaft inside. When the eccentric shaft is rotated, the eccentric shaft will also vibrate.

However, in the conventional electrical toothbrush, the weight blocks of the eccentric shaft are all the same U-shaped notch structures having a fixed form. Therefore, it is impossible to adjust the U-shaped notch structures of the conventional electrical toothbrush so as to change the vibration frequency or vibration amplitude.

It is therefore tried by the applicant to provide an eccentric vibration structure of electrical toothbrush to solve the above problem existing in the conventional electrical toothbrush.

SUMMARY OF THE INVENTION

It is therefore a primary object of the present invention to provide an eccentric vibration structure of electrical toothbrush. The vibration frequency or vibration amplitude of the eccentric vibration structure is adjustable.

To achieve the above and other objects, the eccentric vibration structure of electrical toothbrush of the present invention includes an eccentric rod. Two ends of the eccentric rod are respectively formed with a transmission section and a weight section. The transmission section is drivable by a driving force to rotate so as to drive the weight section to eccentrically vibrate. The weight section has at least one weight part for partially or totally increasing the weight of the weight section, whereby the weight section is unbalanced in weight to deflect from a central axis of the eccentric rod.

Still to achieve the above and other objects, the eccentric vibration structure of electrical toothbrush of the present invention includes an eccentric rod. Two ends of the eccentric rod are respectively formed with a transmission section and a weight section. The transmission section is drivable by a driving force to rotate so as to drive the weight section to eccentrically vibrate. At least one weight block is disposed on the weight section for partially or totally increasing the weight of the weight section, whereby the weight section is unbalanced in weight to deflect from a central axis of the eccentric rod.

Still to achieve the above and other objects, the eccentric vibration structure of electrical toothbrush of the present invention includes an eccentric rod. Two ends of the eccentric rod are respectively formed with a transmission section and a weight section. The transmission section is drivable by a driving force to rotate so as to drive the weight section to eccentrically vibrate. The weight section is formed with at least one material-removed section to partially or totally reduce the weight of the weight section, whereby the weight section is unbalanced in weight to deflect from a central axis of the eccentric rod.

According to the design of the present invention, the eccentric rod can be eccentrically vibrated to achieve the vibration frequency or vibration amplitude adjustment effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1 is a perspective view of a first embodiment of the eccentric vibration structure of electrical toothbrush of the present invention;

FIG. 7 is a perspective view of a second embodiment of the eccentric vibration structure of electrical toothbrush of the present invention;

FIG. 8 is a sectional view of the weight section of the second embodiment of the eccentric vibration structure of electrical toothbrush of the present invention;

FIG. 9 is a perspective exploded view of a third embodiment of the eccentric vibration structure of electrical toothbrush of the present invention;

FIG. 10 is a sectional view of the weight section of the third embodiment of the eccentric vibration structure of electrical toothbrush of the present invention;

FIG. 13 is a perspective view of a modified embodiment of the third embodiment of the eccentric vibration structure of electrical toothbrush of the present invention;

FIG. 14 is a sectional view of the weight section of the third embodiment of the eccentric vibration structure of electrical toothbrush of the present invention;

DETAILED DESCRIPTION OF THE PREFERRED EMBODIMENTS

Figure 1:
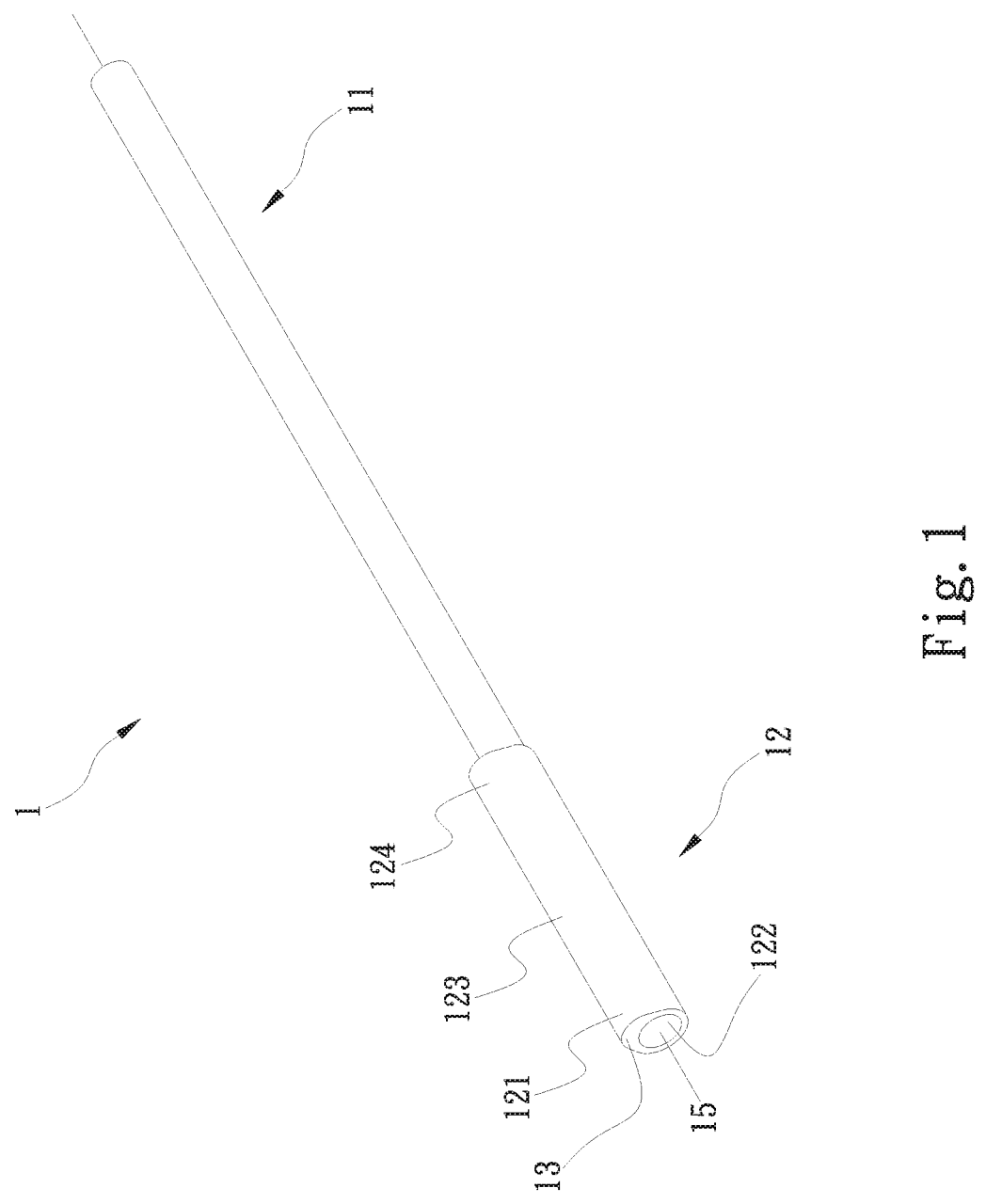
Figure 2:
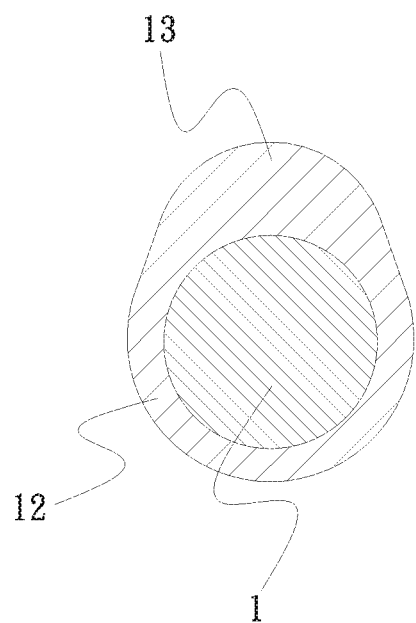
FIG. 2 is a sectional view of the weight section of the first embodiment of the eccentric vibration structure of electrical toothbrush of the present invention.

Please refer to FIGS. 1 and 2. FIG. 1 is a perspective view of a first embodiment of the eccentric vibration structure of electrical toothbrush of the present invention. FIG. 2 is a sectional view of the weight section of the first embodiment of the eccentric vibration structure of electrical toothbrush of the present invention. According to the first embodiment, the eccentric vibration structure of electrical toothbrush of the present invention includes an eccentric rod 1. The eccentric rod 1 is an axially extending shaft rod (core) in the form of a bar (stein, stick or rod). Two ends of the eccentric rod 1 are respectively formed with a transmission section 11 and a weight section 12. The transmission section 11 and the weight section 12 can be integrally formed. Alternatively, the transmission section 11 and the weight section 12 are two separate components, which are securely integrally connected with each other by means of insert injection molding, adhesion, engagement, press fit, welding or screwing.

The transmission section 11 is drivable by a driving force. The driving force is output from a drive source.

The weight section 12 has at least one weight part 13 for partially or totally increasing the weight of the weight section 12, whereby the weight section 12 is unbalanced in weight to deflect from a central axis 15 of the eccentric rod 1. The unbalance in weight is such that the at least one weight part 13 partially or totally increases the weight of the weight section 12, whereby the gravity center of the weight section 12 is deflected from the central axis 15 of the eccentric rod 1. Accordingly, when the weight section 12 is driven by the transmission section 11 to rotate, the weight section 12 will eccentrically vibrate.

Figure 3:
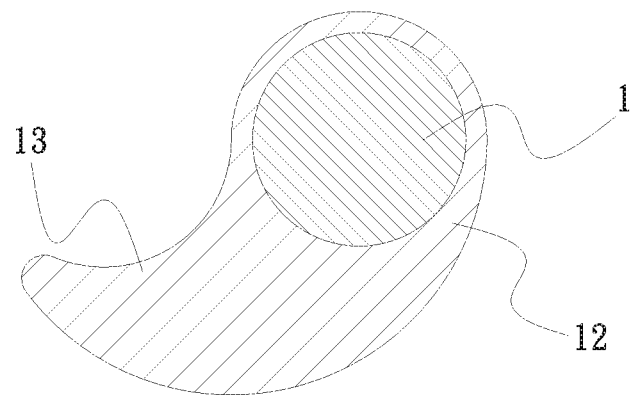
FIG. 3 is a sectional view of a modified embodiment of the first embodiment of the eccentric vibration structure of electrical toothbrush of the present invention.
Figure 4:
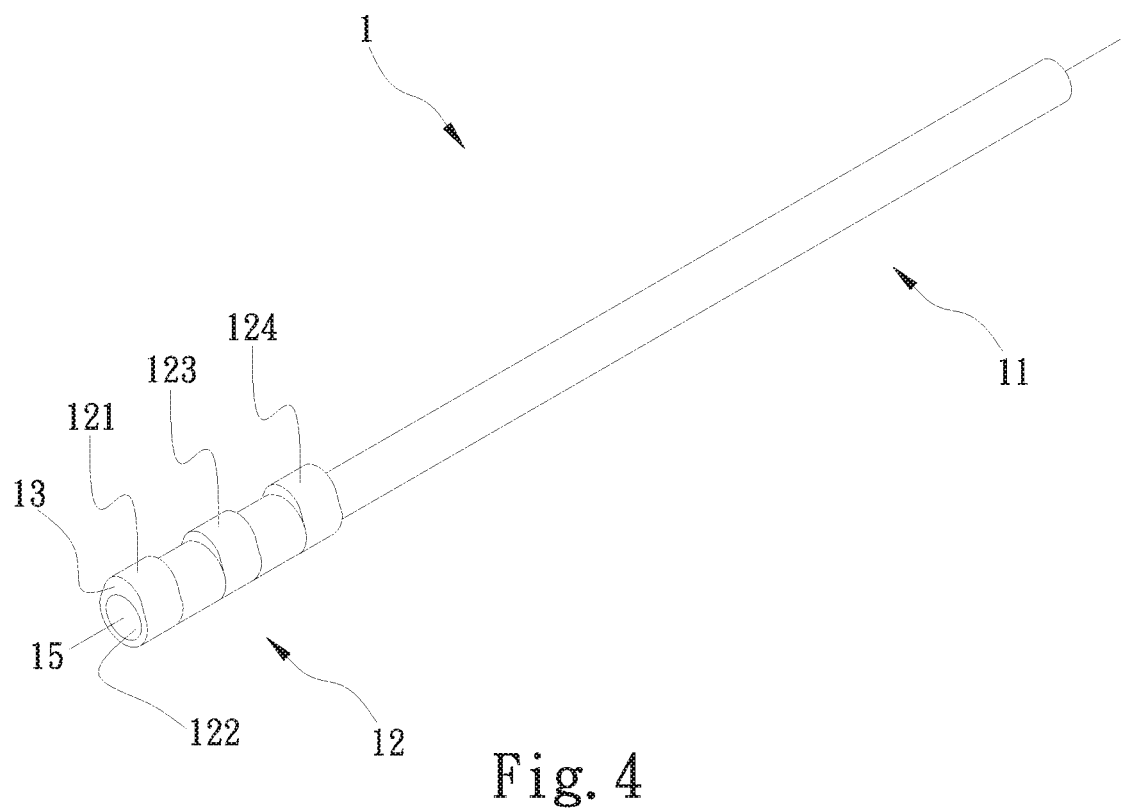
FIG. 4 is a perspective view of the first embodiment of the eccentric vibration structure of electrical toothbrush of the present invention, showing that the weight parts are raised.
Figure 5:
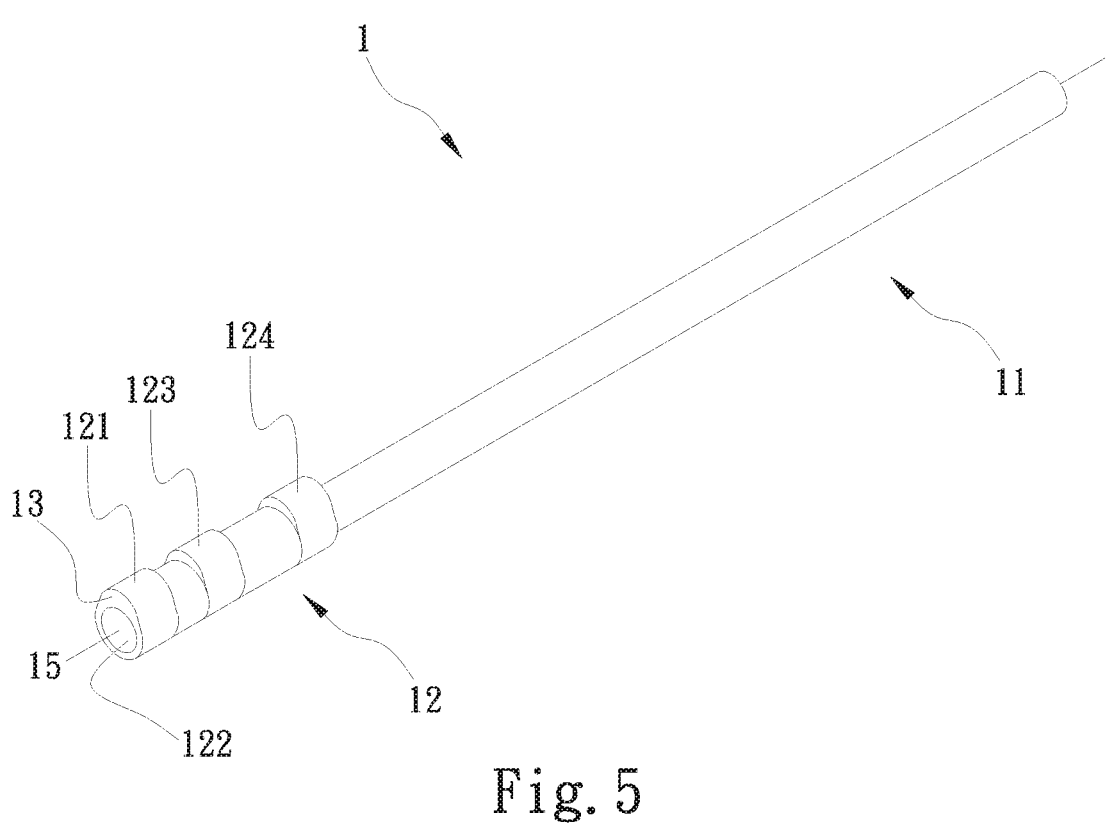
FIG. 5 is a perspective view of the first embodiment of the eccentric vibration structure of electrical toothbrush of the present invention, showing that the weight parts are raised.
Figure 6:
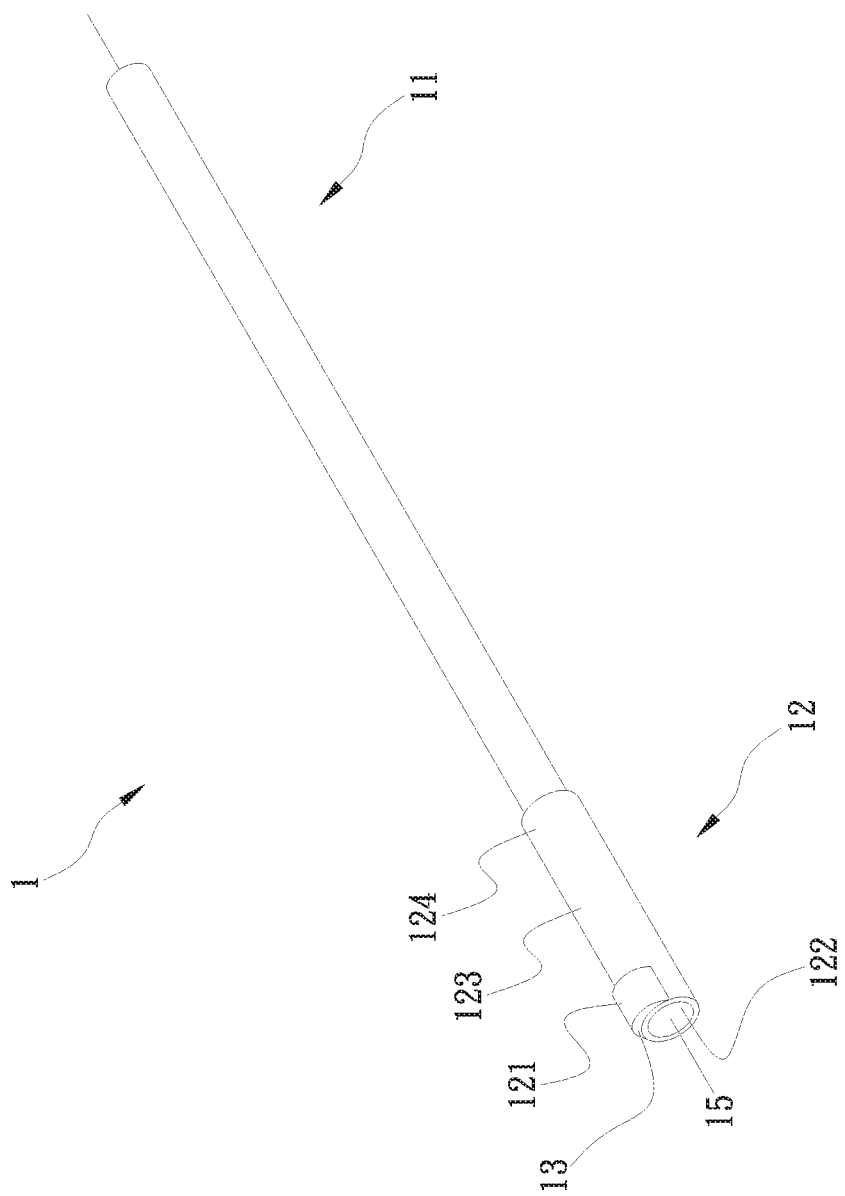
FIG. 6 is a perspective view of the first embodiment of the eccentric vibration structure of electrical toothbrush of the present invention, showing that the weight parts are raised.

The weight section 12 has an egg-shaped cross section (as shown in FIG. 2), a cashew nut-shaped cross section (as shown in FIG. 3) or any geometrical cross section. The at least one weight part 13 and the weight section 12 are integrally formed. The weight section 12 has a first area 121, a second area 123 and a third area 124. The first area 121 is adjacent to a free end section 122 of the weight section 12. The second area 123 is adjacent to the transmission section 11. The third area 124 is positioned between the first and second areas 121, 123. The at least one weight part 13 is disposed on the weight section 12 to selectively axially extend from the first area 121 to the third area 124 (as shown in FIG. 1), at equal intervals (as shown in FIG. 4) or at unequal intervals (as shown in FIG. 5). Alternatively, the at least one weight part 13 is disposed on the first area 121 of the weight section 12 (as shown in FIG. 6) or any of the second and third areas 123, 124. In case that the at least one weight part 13 axially extends, the at least one weight part 13 will totally increase the weight of the weight section 12. In case that the at least one weight part 13 is disposed at equal intervals or unequal intervals or disposed on any of the first, second and third areas 121, 123, 124, the at least one weight part 13 will partially increase the weight of the weight section 12 to lead to unbalance in weight of the weight section 12.

The eccentric rod 1 can be made of thermoplastic material such as, but not limited to, polyoxymethylene (POM), which has wear resistance.

According to the design of the present invention, the at least one weight part 13 is eccentrically positioned relative to the central axis 15 of the eccentric rod 1, whereby the weight of the weight section 12 is partially or totally increased to lead to unbalance in weight. Therefore, the gravity center of the weight section 12 is deflected from the central axis 15 of the eccentric rod 1. Accordingly, when the eccentric rod 1 is driven by the driving force, the position of the weight section 12 in circumferential direction is continuously varied to produce eccentric vibration effect.

Please refer to FIGS. 7 and 8. FIG. 7 is a perspective view of a second embodiment of the eccentric vibration structure of electrical toothbrush of the present invention. FIG. 8 is a sectional view of the weight section of the second embodiment of the eccentric vibration structure of electrical toothbrush of the present invention. Also referring to FIGS. 1 to 6, the second embodiment is partially identical to the first embodiment in structure and function and thus will not be redundantly described hereinafter. The second embodiment is different from the first embodiment in that at least one weight block 14 is directly connected on the surface of the weight section 12, whereby the weight section 12 is unbalanced in weight to deflect from the central axis 15 of the eccentric rod 1.

The connection can be achieved by means of insert injection molding, adhesion, engagement, press fit, welding or screwing. The at least one weight block 14 can be made of metal or nonmetal material.

Please now refer to FIGS. 9 and 10. FIG. 9 is a perspective exploded view of a third embodiment of the eccentric vibration structure of electrical toothbrush of the present invention. FIG. 10 is a sectional view of the weight section of the third embodiment of the eccentric vibration structure of electrical toothbrush of the present invention. Also referring to FIGS. 7 and 8, the third embodiment is partially identical to the second embodiment in structure and function and thus will not be redundantly described hereinafter. The third embodiment is different from the second embodiment in that the weight part 13 of the weight section 12 is formed with at least one receiving space 125 on the surface or inside the main body. The at least one weight block 14 is disposed in the at least one receiving space 125.

Figure 11:
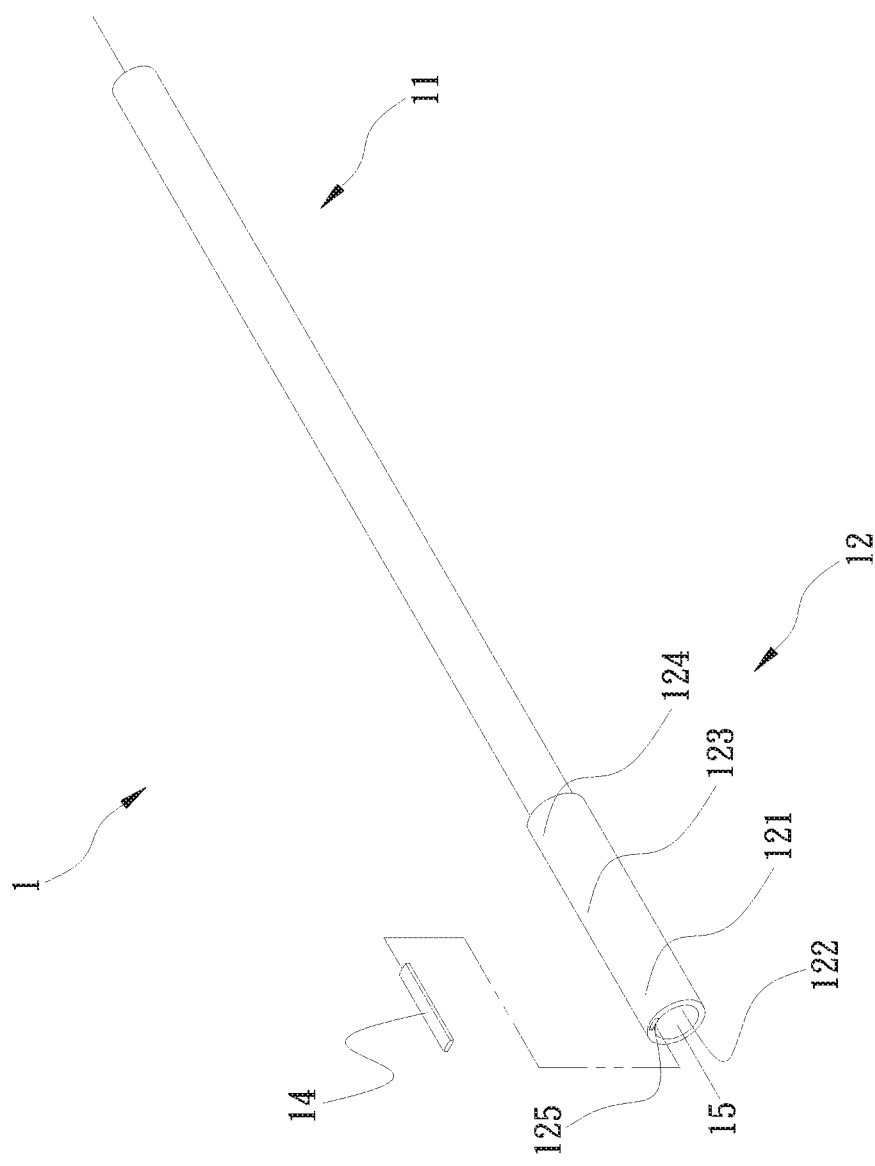
FIG. 11 is a perspective view of a modified embodiment of the third embodiment of the eccentric vibration structure of electrical toothbrush of the present invention.
Figure 12:
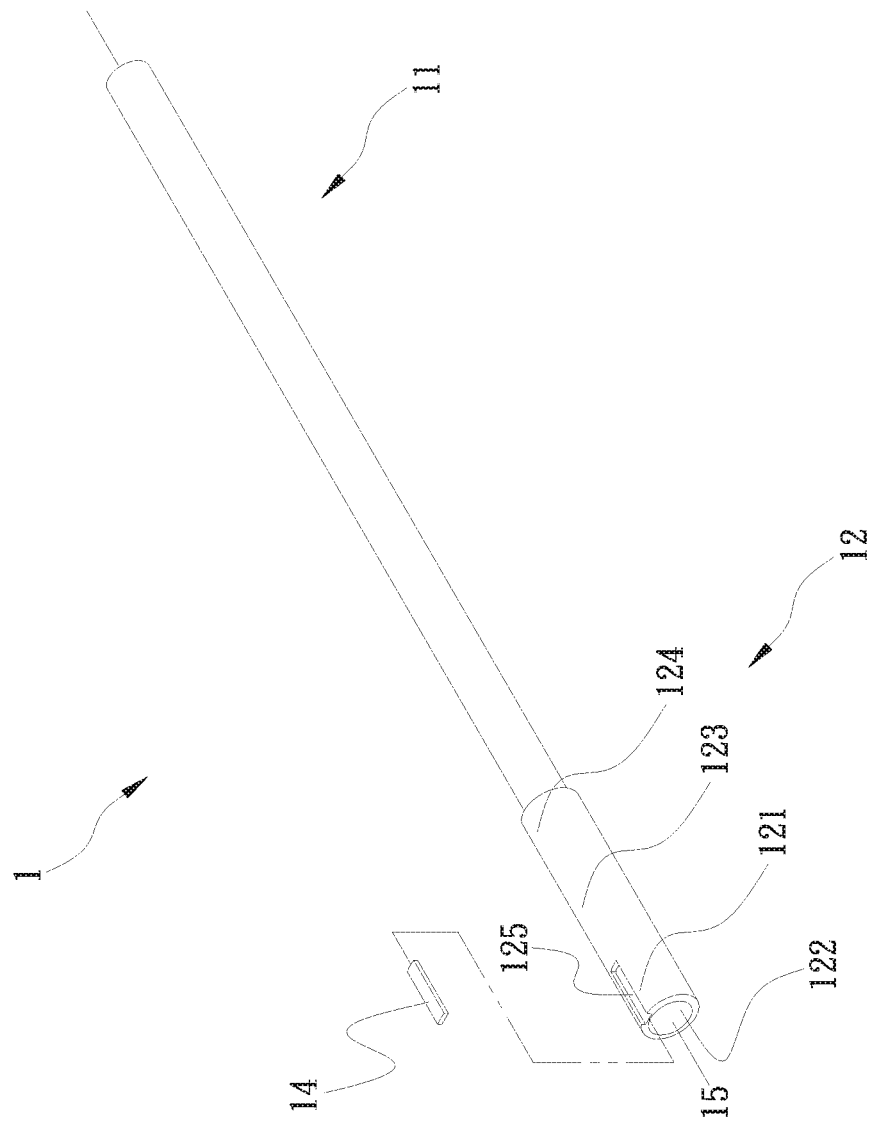
FIG. 12 is a perspective view of a modified embodiment of the third embodiment of the eccentric vibration structure of electrical toothbrush of the present invention.

The at least one receiving space 125 is selectively inward recessed from the surface of the weight section 12 (as shown in FIG. 9), formed in the weight section 12 to pass through a free end section 122 of the weight section 12 (as shown in FIG. 11) or inward recessed from the surface of the weight section 12 to axially pass through the free end section 122 of the weight section 12 (as shown in FIG. 12).

In this embodiment, there is one weight block 14 selectively disposed in one of the receiving spaces 125. However, in other embodiments, there are multiple weight blocks 14 selectively disposed in some of multiple receiving spaces 125. Alternatively, the weight blocks 14 have different weights and are disposed in some or all of multiple receiving spaces 125.

In a modified embodiment, the eccentric vibration structure of electrical toothbrush of the present invention further includes at least one cover member 16. The cover member 16 is correspondingly mated with the receiving space 125 free from the at least one weight block 14. The at least one cover member 16 and the corresponding weight section 12 together form a cylindrical outer surface (as shown in FIGS. 13 and 14) or a non-cylindrical outer surface. Accordingly, the notch on the outer surface of the weight section 12 is reduced. In this case, when the weight section 12 is driven to rotated, the wind resistance is reduced and the noise is lowered.

Figure 15:
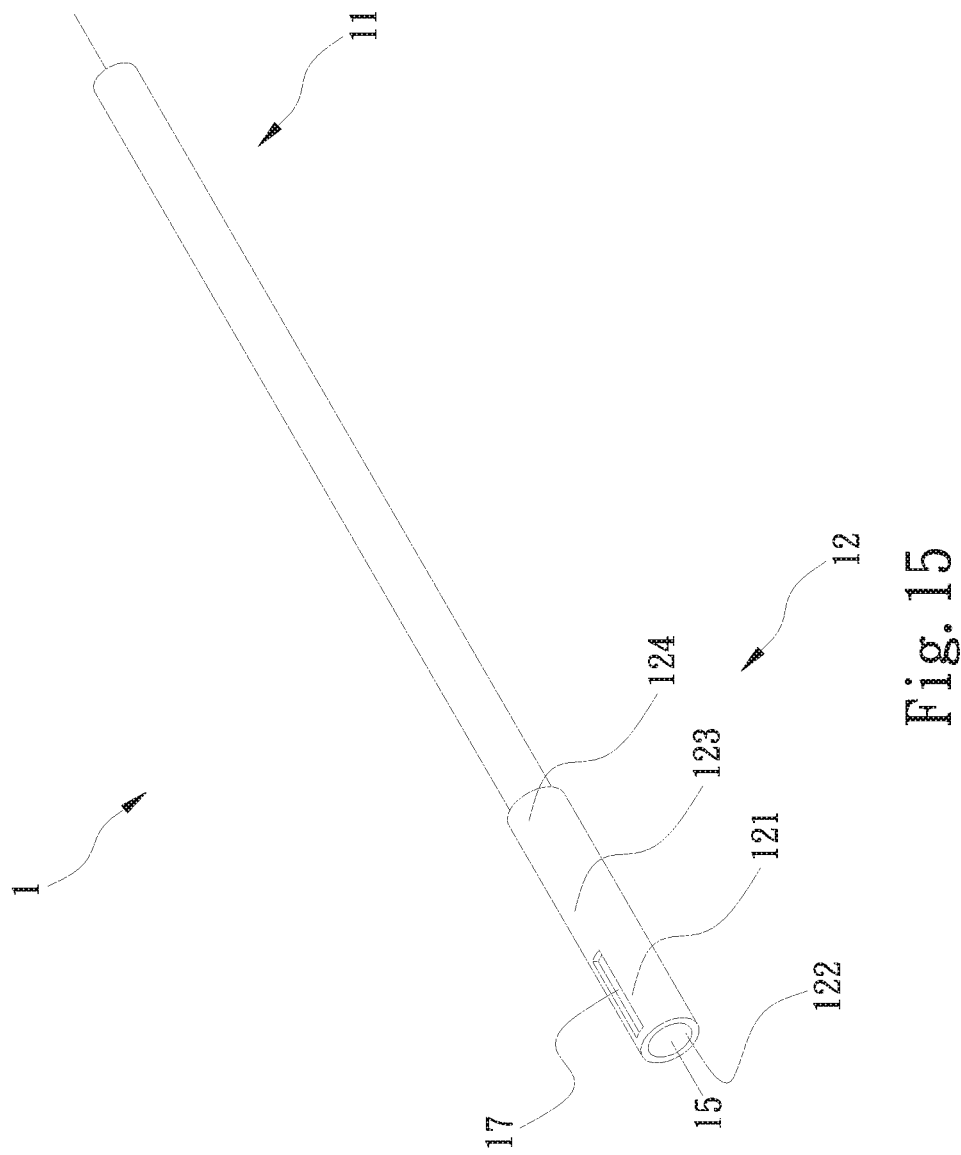
FIG. 15 is a perspective view of a fourth embodiment of the eccentric vibration structure of electrical toothbrush of the present invention.

Please now refer to FIG. 15, which is a perspective view of a fourth embodiment of the eccentric vibration structure of electrical toothbrush of the present invention. Also referring to FIGS. 1 to 6 and FIGS. 9 to 12, the fourth embodiment is partially identical to the first and third embodiments in structure and function and thus will not be redundantly described hereinafter. The fourth embodiment is different from the first and third embodiments in that the weight section 12 is formed with at least one material-removed section 17 on the surface or inside the main body to reduce the weight, whereby the weight section 12 is unbalanced in weight to deflect from the central axis 15 of the eccentric rod 1.

The material-removed section 17 is formed by means of milling, injection molding, insert injection molding or 3D printing.

Figure 16:
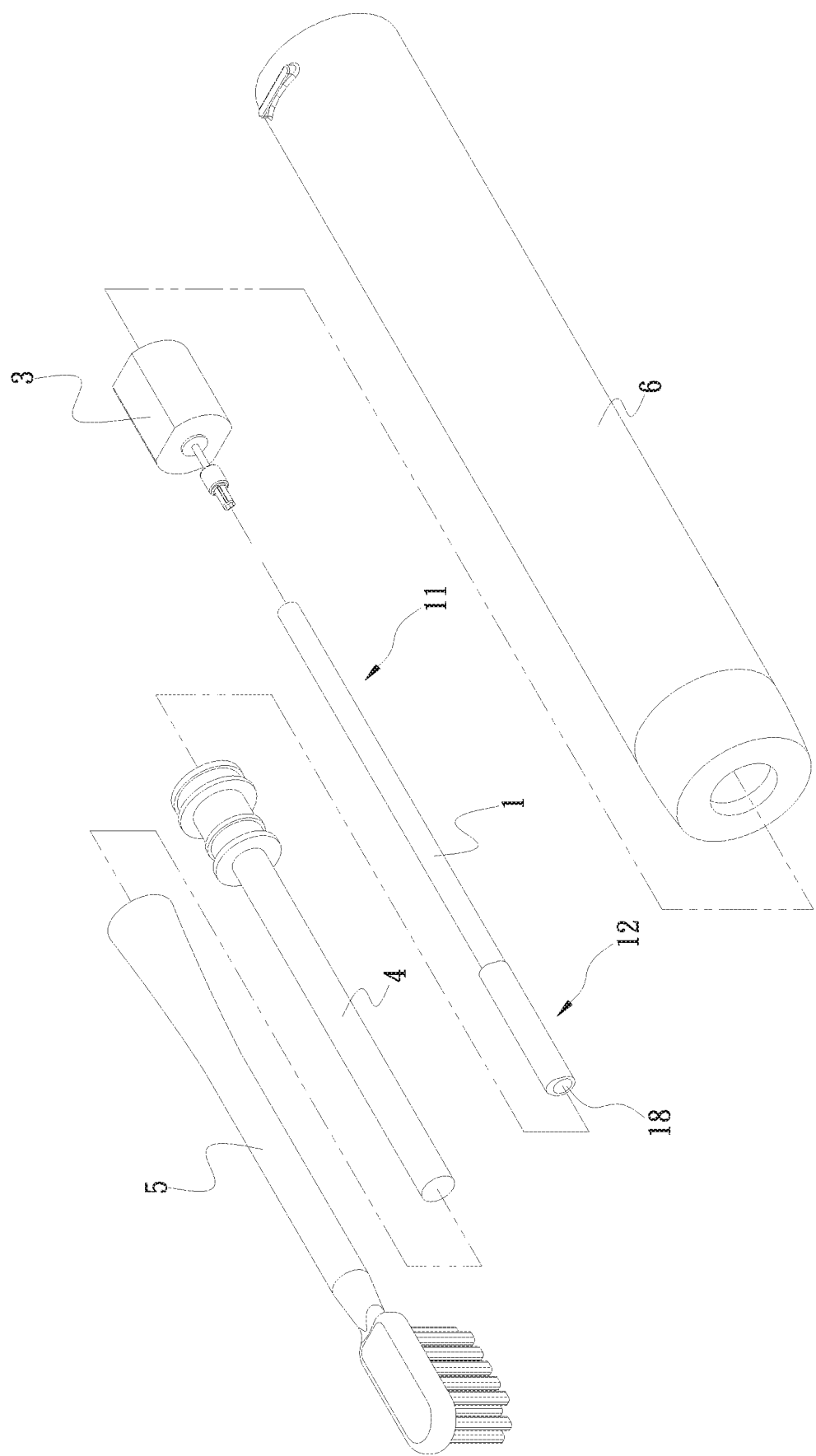
FIG. 16 is a perspective exploded view of a fifth embodiment of the eccentric vibration structure of electrical toothbrush of the present invention.
Figure 17:
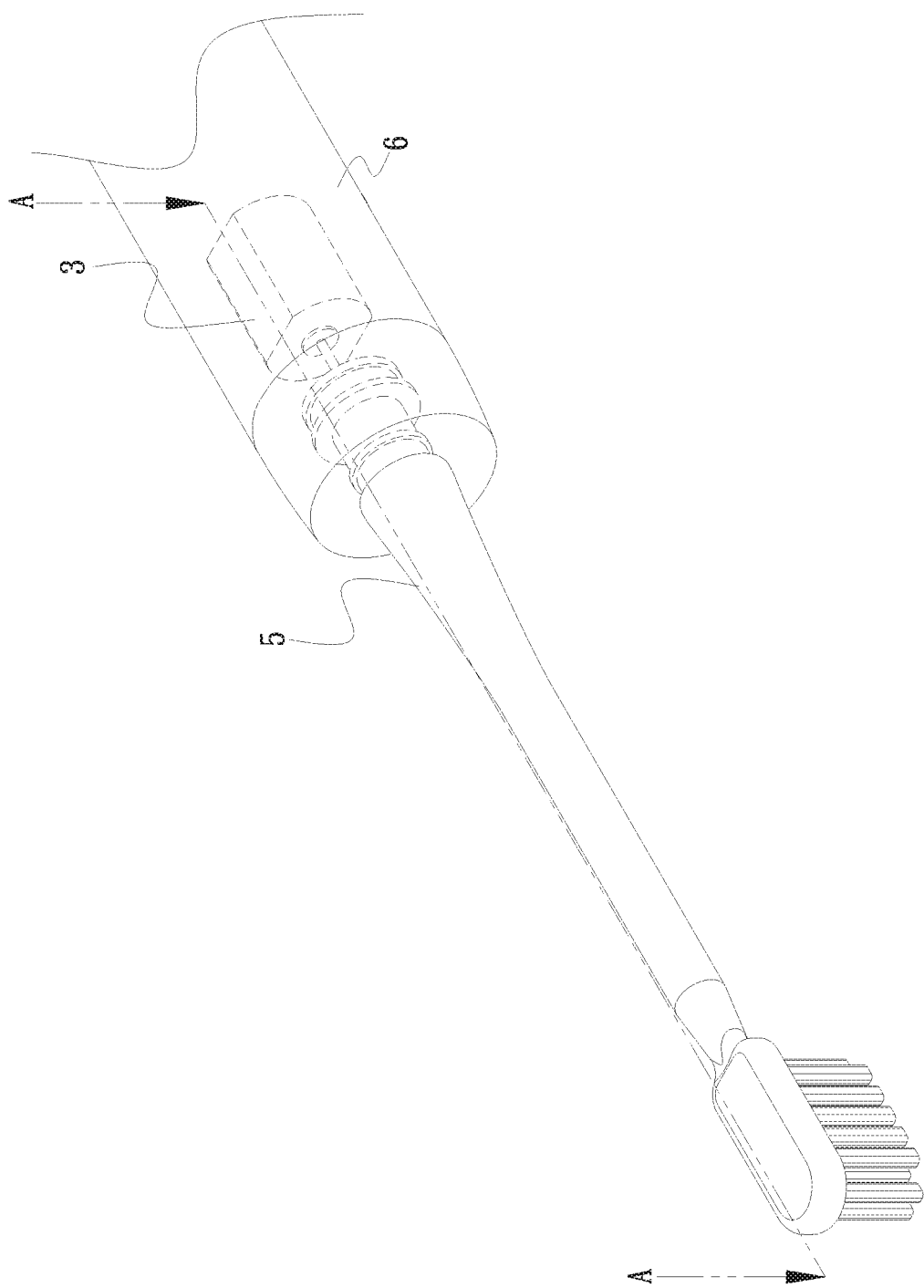
FIG. 17 is a perspective assembled view of the fifth embodiment of the eccentric vibration structure of electrical toothbrush of the present invention.
Figure 18:
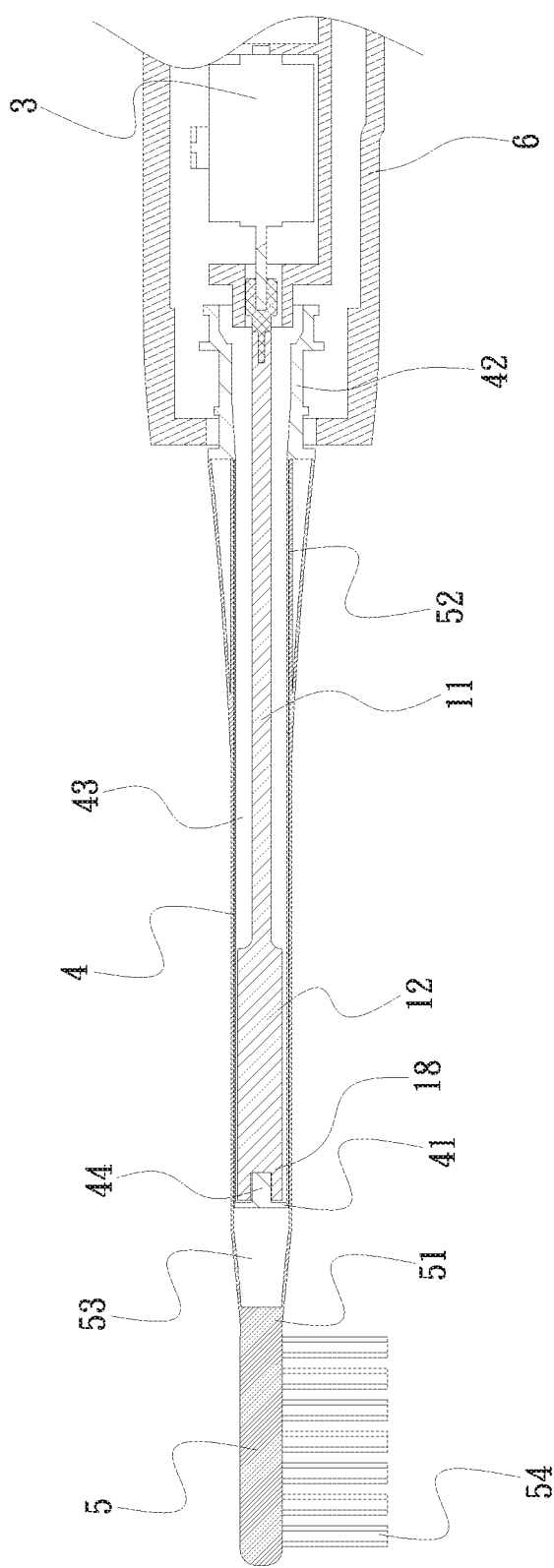
FIG. 18 is a sectional view of the eccentric vibration structure of electrical toothbrush of the present invention, taken along line A-A of FIG. 17.
Figure 19:
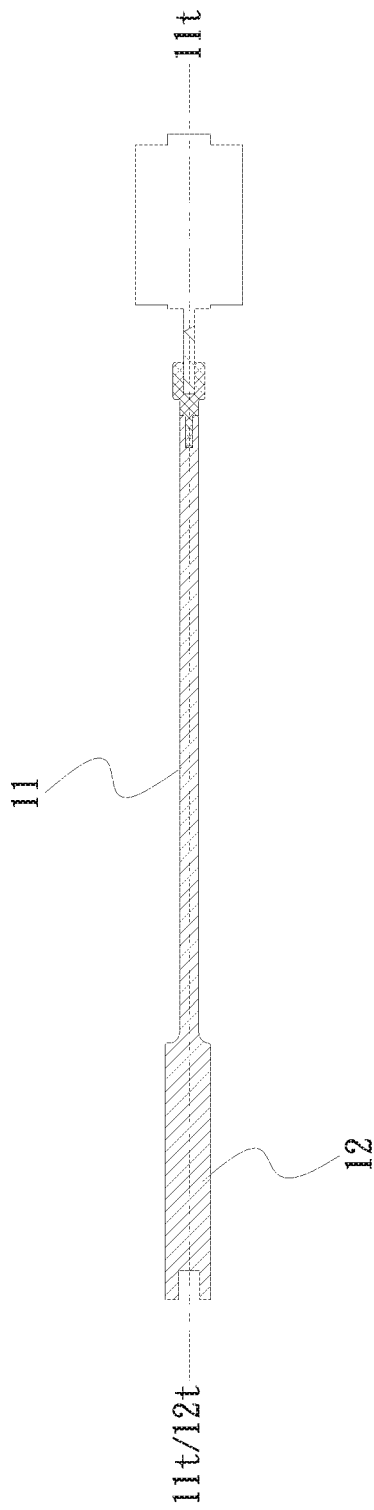
FIG. 19 is a sectional view of the eccentric vibration structure of electrical toothbrush of the present invention in a still state.
Figure 20:
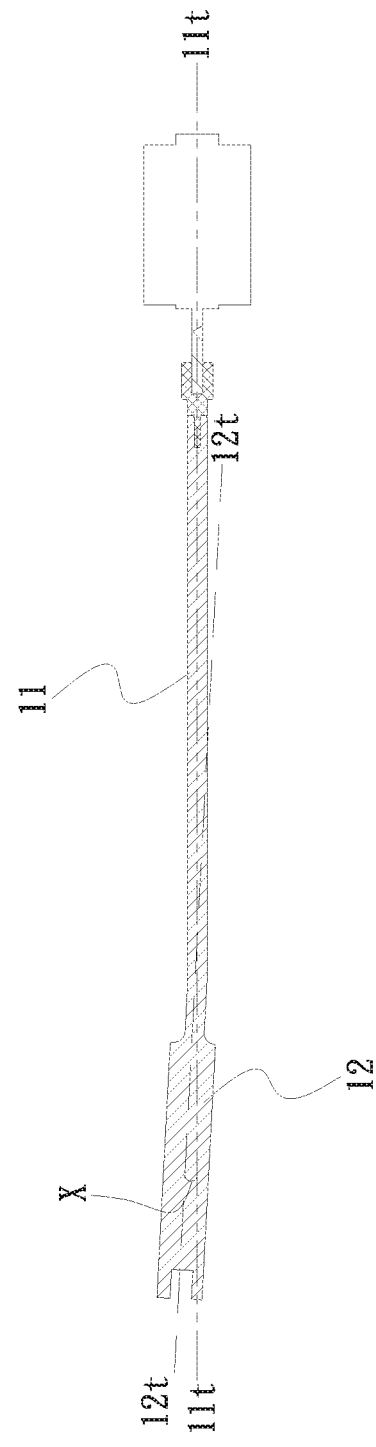
FIG. 20 is a sectional view of the eccentric vibration structure of electrical toothbrush of the present invention in a vibration state.

Please now refer to FIGS. 16 to 20. FIG. 16 is a perspective exploded view of a fifth embodiment of the eccentric vibration structure of electrical toothbrush of the present invention. FIG. 17 is a perspective assembled view of the fifth embodiment of the eccentric vibration structure of electrical toothbrush of the present invention. FIG. 18 is a sectional view of the eccentric vibration structure of electrical toothbrush of the present invention, taken along line A-A of FIG. 17. FIG. 19 is a sectional view of the eccentric vibration structure of electrical toothbrush of the present invention in a still state. FIG. 20 is a sectional view of the eccentric vibration structure of electrical toothbrush of the present invention in a vibration state. Also referring to FIGS. 1 to 15, the fifth embodiment is partially identical to the first, second, third and fourth embodiments in structure and function and thus will not be redundantly described hereinafter. The fifth embodiment is different from the first, second, third and fourth embodiments in that the eccentric vibration structure of electrical toothbrush of the present invention further includes a drive source 3, a vibration stein 4, a cleaning fitting head 5 and a main body section 6.

The drive source 3 is such as a motor for illustration purposes. The drive source 3 is correspondingly connected with one end of the transmission section 11 distal from the weight section 12 to output driving power to the eccentric rod 1.

The vibration stein 4 has a first closed end 41 and a first open end 42. The first closed end 41 and the first open end 42 together define a first space 43. A first assembling section 44 protrudes from the first closed end 41 to the first space 43.

One end section of the weight section 12 distal from the transmission section 11 has a second assembling section 18. The eccentric rod 1 is placed into the first space 43 from the first open end 42 and the first assembling section 44 is correspondingly connected with the second assembling section 18.

The cleaning fitting head 5 has a second closed end 51 and a second open end 52. The second closed end 51 and the second open end 52 together define a second space 53. A brush section 54 is disposed on outer side of the second closed end 51. The cleaning fitting head 5 is fitted around the vibration stein 4 via the second space 53.

The main body section 6 is correspondingly connected with the cleaning fitting head 5 for a user to hold. The drive source 3 is received in the main body section 6.

Accordingly, when the drive source 3 rotates to apply the driving force to the transmission section 11, the transmission section 11 is driven to make the eccentric rod 1 rotate, whereby the weight section 12 eccentrically vibrates. The vibration of the weight section 12 is transmitted from the second assembling section 18 to the first assembling section 44 of the vibration stein 4 and further transmitted to the cleaning fitting head 5. Therefore, the cleaning fitting head 5 is correspondingly vibrated.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. An eccentric vibration structure of electrical toothbrush comprising:
    an eccentric rod, two ends of the eccentric rod being respectively formed with a transmission section and a weight section integrally formed and bonded with the transmission section and configured in a coaxial configuration, the transmission section being drivable by a driving force to rotate so as to drive the weight section to eccentrically vibrate, the weight section having at least one weight part for partially or totally increasing the weight of the weight section, whereby the weight section is unbalanced in weight to deflect from a central axis of the eccentric rod.

2. The eccentric vibration structure of electrical toothbrush as claimed in claim 1, wherein the at least one weight part and the weight section are integrally formed.

3. The eccentric vibration structure of electrical toothbrush as claimed in claim 1, wherein the weight section has an egg-shaped cross section.

4. The eccentric vibration structure of electrical toothbrush as claimed in claim 1, wherein the weight section has a first area, a second area and a third area, the first area being adjacent to a free end section of the weight section, the second area being adjacent to the transmission section, the third area being positioned between the first and second areas, the at least one weight part being disposed on the weight section to selectively axially extend from the first area to the third area, at equal intervals or at unequal intervals or the at least one weight part being disposed on any of the first, second and third areas of the weight section.

5. The eccentric vibration structure of electrical toothbrush as claimed in claim 1, further comprising at least one weight block connected with the at least one weight part.

6. The eccentric vibration structure of electrical toothbrush as claimed in claim 5, wherein the at least one weight block and the weight section are secured to each other by means of insert injection molding, adhesion, engagement, press fit, welding or screwing.

7. The eccentric vibration structure of electrical toothbrush as claimed in claim 5, wherein the weight part has at least one receiving space and the at least one weight block is disposed in the at least one receiving space.

8. The eccentric vibration structure of electrical toothbrush as claimed in claim 7, wherein the at least one receiving space is formed in the weight section or the at least one receiving space is inward recessed from a surface of the weight section.

9. The eccentric vibration structure of electrical toothbrush as claimed in claim 7, wherein the weight part has multiple receiving spaces and the at least one weight block is selectively disposed in one of the receiving spaces.

10. The eccentric vibration structure of electrical toothbrush as claimed in claim 9, further comprising at least one cover member, the cover member being correspondingly mated with the receiving space free from the at least one weight block, the at least one cover member and the corresponding weight section together forming a cylindrical outer surface or a non-cylindrical outer surface.

11. The eccentric vibration structure of electrical toothbrush as claimed in claim 7, wherein the weight section has multiple receiving spaces and multiple weight blocks are selectively disposed in some of the receiving spaces.

12. The eccentric vibration structure of electrical toothbrush as claimed in claim 7, wherein the weight section has multiple receiving spaces and multiple weight blocks with different weights are disposed in some or all of the receiving spaces.

13. The eccentric vibration structure of electrical toothbrush as claimed in claim 7, wherein the at least one receiving space has a cross section of any geometrical configuration, the at least one weight block having a cross section of any geometrical configuration corresponding to the at least one receiving space.

14. The eccentric vibration structure of electrical toothbrush as claimed in claim 1, wherein the weight section has a cashew nut-shaped cross section.

15. An eccentric vibration structure of electrical toothbrush comprising:
an eccentric rod, two ends of the eccentric rod being respectively formed with a transmission section and a weight section, the transmission section and the weight section configured in a coaxial configuration, the weight section being non-removably integrated with the one end of the eccentric rod, the transmission section being drivable by a driving force to rotate so as to drive the weight section to eccentrically vibrate, a portion of an outside of the weight section being hollowed out to form with at least one material-removed section to partially or totally reduce the weight of the weight section, whereby the weight section is unbalanced in weight to deflect from a central axis of the eccentric rod.

16. The eccentric vibration structure of electrical toothbrush as claimed in claim 15, wherein the at least one material-removed section has a cross section of any geometrical configuration.

17. The eccentric vibration structure of electrical toothbrush as claimed in claim 15, wherein the at least one material-removed section is selectively formed by means of milling, injection molding, insert injection molding or 3D printing.

18. The eccentric vibration structure of electrical toothbrush as claimed in claim 15, wherein the weight section has a first area, a second area and a third area, the first area being adjacent to a free end section of the weight section, the second area being adjacent to the transmission section, the third area being positioned between the first and second areas, an at least one weight part being disposed on the weight section to selectively axially extend from the first area to the third area, at equal intervals or at unequal intervals or the at least one weight part being disposed on any of the first, second and third areas of the weight section.

19. The eccentric vibration structure of electrical toothbrush as claimed in claim 15, wherein the at least one material-removed section is formed inside the weight section or the surface of the weight section is recessed to form the at least one material-removed section.

* * * * *